US009618266B2

(12) United States Patent
Carraway (10) Patent No.: US 9,618,266 B2
(45) Date of Patent: *Apr. 11, 2017

(54) LADLE METALLURGY FURNACE HAVING IMPROVED ROOF

(71) Applicant: Superior Machine Co. of South Carolina, Inc., Florence, SC (US)

(72) Inventor: Kenneth L. Carraway, Scranton, SC (US)

(73) Assignee: Superior Machine Co. of South Carolina, Inc., Florence, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,568

(22) Filed: Oct. 8, 2013

(65) Prior Publication Data
US 2014/0035209 A1 Feb. 6, 2014

Related U.S. Application Data

(63) Continuation of application No. 13/018,742, filed on Feb. 1, 2011, now Pat. No. 8,858,867.

(51) Int. Cl.
| | |
|---|---|
| *F27D 1/12* | (2006.01) |
| *F27D 1/18* | (2006.01) |
| *F27D 9/00* | (2006.01) |
| *F27D 99/00* | (2010.01) |
| *F27D 1/02* | (2006.01) |
| *C21C 5/52* | (2006.01) |

(52) U.S. Cl.
CPC .............. *F27D 1/12* (2013.01); *F27D 1/02* (2013.01); *F27D 1/1808* (2013.01); *F27D 1/1816* (2013.01); *F27D 9/00* (2013.01); *F27D 99/0006* (2013.01); *C21C 5/5211* (2013.01); *Y02P 10/216* (2015.11)

(58) Field of Classification Search
CPC ...... F27D 1/12; F27D 99/0006; F27D 1/1808; F27D 1/1816
USPC ............................................. 266/241; 373/76
See application file for complete search history.

(56) References Cited

U.S. PATENT DOCUMENTS

| | | | |
|---|---|---|---|
| 4,046,323 A | 9/1977 | McKerrow et al. | |
| 4,633,480 A | 12/1986 | Bleimann | |
| 4,644,558 A | 2/1987 | Kerr | |
| 4,722,483 A | 2/1988 | Saville et al. | |

(Continued)

OTHER PUBLICATIONS

Supplemental Information Disclosure Statement filed in U.S. Appl. No. 13/018,742, filed Feb. 21, 2011, as provided by representative for Applicant, Superior Machine Company of S.C.

*Primary Examiner* — Scott Kastler
(74) *Attorney, Agent, or Firm* — Nelson Mullins Riley & Scarborough, LLP (57) ABSTRACT

The present invention relates generally to a ladle metallurgy furnace having an improved roof structure. The improved roof may comprise an internal surface structure having a substantially smooth exterior surface, an external surface structure spaced apart from the internal surface structure, a plurality of channels that are defined intermediate the internal and external surface structures, a supply port in fluid communication with at least one channel through the second surface structure and in further fluid communication with a supply line, and a return port in fluid communication with at least one channel through the external surface structure and in further fluid communication with a return line.

24 Claims, 10 Drawing Sheets

(56) References Cited

U.S. PATENT DOCUMENTS

| | | |
|---|---|---|
| 4,903,640 A | 2/1990 | Howard |
| 4,903,752 A | 2/1990 | Rokop |
| 5,067,659 A | 11/1991 | Heeren et al. |
| 5,327,453 A | 7/1994 | Arthur et al. |
| 5,397,379 A | 3/1995 | Barker et al. |
| 5,426,664 A | 6/1995 | Grove |
| 5,999,558 A | 12/1999 | Miner, Jr. et al. |
| 6,059,028 A | 5/2000 | Kincheloe et al. |
| 6,137,823 A * | 10/2000 | Johnson et al. ............... 373/76 |
| 6,189,818 B1 | 2/2001 | Kunz et al. |
| 6,269,112 B1 | 7/2001 | Poloni et al. |
| 6,330,269 B1 | 12/2001 | Manasek et al. |
| 6,404,799 B1 | 6/2002 | Mori et al. |
| 6,418,157 B1 | 7/2002 | Fox |
| 6,547,849 B2 | 4/2003 | Gross et al. |
| 6,870,873 B2 | 3/2005 | Lyons et al. |
| 6,910,431 B2 | 6/2005 | Satchell, Jr. |
| 6,999,495 B2 | 2/2006 | Popenov |
| 7,824,604 B2 | 11/2010 | Higgins et al. |
| 8,858,867 B2 * | 10/2014 | Carraway ................... 266/241 |
| 2003/0005314 A1 | 1/2003 | Gammel et al. |

\* cited by examiner

LADLE METALLURGY FURNACE HAVING IMPROVED ROOF

CROSS-REFERENCE TO RELATED APPLICATIONS

This patent application is a continuation of copending U.S. patent application Ser. No. 13/018,742, filed on Feb. 1, 2011, now U.S. Pat. No. 8,858,867, the entire disclosure of which is hereby incorporated by reference as if set forth verbatim herein and relied upon for all purposes.

FIELD OF THE INVENTION

The present invention relates generally to ladle metallurgy furnaces. More particularly, the present invention relates to a ladle metallurgy furnace having an improved roof.

BACKGROUND OF THE INVENTION

The ladle metallurgy furnace ("LMF") is an additional steel refining step that is used to heat, mix, and refine molten material using alloys and additives mixed with the molten material. Among a number of other components, LMFs include a ladle (which is typically a refractory lined steel vessel that holds molten material for refining), electrodes for providing heat to the molten material, and a roof that sits over the ladle during the refining process. The roof of an LMF maintains heat in the ladle during the refining process and also further assists in directing off gases generated from the refining process out and away from the furnace. The roof further serves to contain the molten material and slag, which are impurities formed on the top layer of the molten material, within the ladle. During the refining process, the molten material and slag tend to splash as a result of the turbulent action generated by the electrodes applying energy to the molten material.

In order to protect the underside of the LMF roof from the splash of molten material, some LMF roofs have been constructed with steel and lined with refractory. Water cooled components constructed principally from carbon steel pipe or tubing applied to the underside of the roof have also been provided as an alternative to refractory lined equipment. With the use of pipe and/or tubing, however, slag has a tendency to adhere to the exposed pipes or multiple welding joints, cracks, and crevices that are present on and between the pipes when it splashes and makes contact with the inside surface of the LMF roof. Additional slag will "stick" to the adhered slag resulting in the growth of stalactite-type slag structures. Over time this adhered slag will cause excess weight to the LMF roof and/or may fall into the molten material during refining, thereby, contaminating the refined material.

SUMMARY OF THE INVENTION

The present invention recognizes and addresses the foregoing considerations, and others, of prior art construction and methods.

According to an aspect, the present invention provides a ladle metallurgy furnace that includes a ladle, with an open top, in the form of a vessel for containing molten material. The furnace further includes a ladle metallurgy furnace roof positioned over the open top of the ladle. The ladle metallurgy furnace roof includes an internal structure with a substantially smooth exterior surface, an external surface structure spaced apart from the internal surface and an electrode opening. The ladle metallurgy furnace also includes electrodes extending through the ladle metallurgy furnace roof opening and is received in the ladle.

According to another aspect, the present invention also provides a ladle metallurgy furnace roof with an internal surface structure having a substantially smooth exterior surface, an external surface structure spaced apart from the internal surface structure, a plurality of channels that are defined intermediate the internal and external surface structures, a supply port in fluid communication with at least one channel through the second surface structure and in further fluid communication with a supply line, and a return port in fluid communication with at least one channel through the external surface structure and in further fluid communication with a return line.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
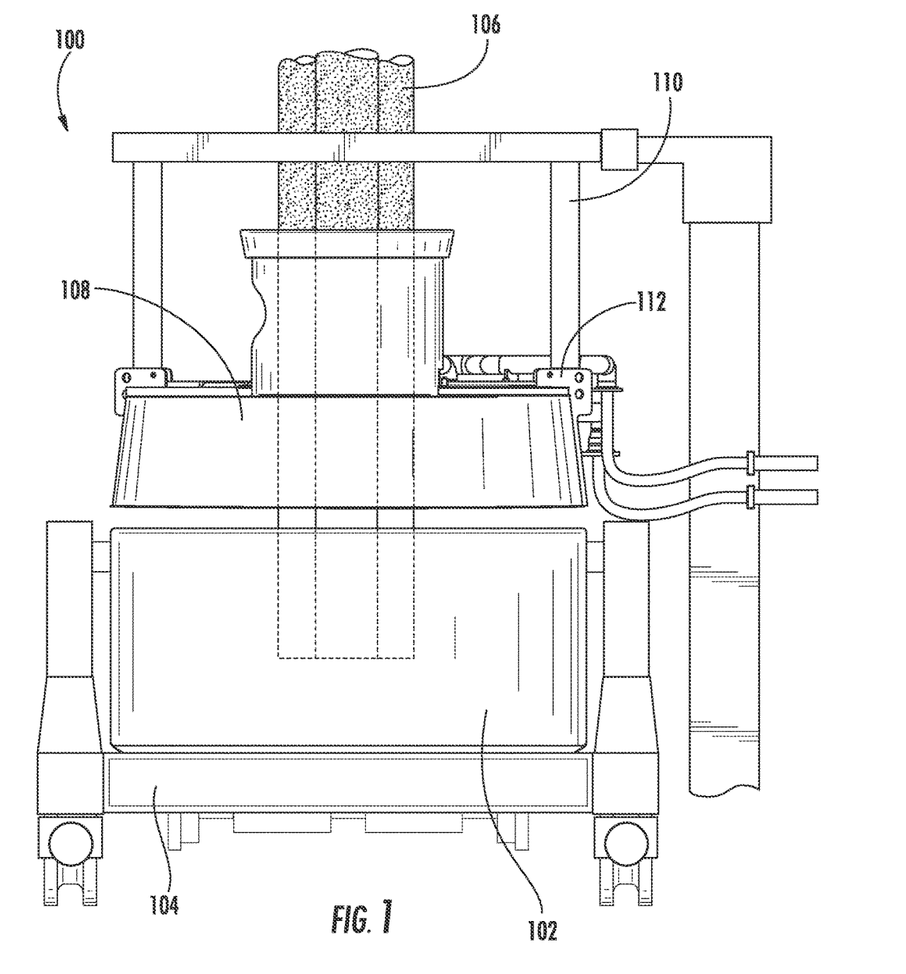
FIG. 1 is a front view of a ladle metallurgy furnace in accordance with a first embodiment of the present invention.

A ladle metallurgy furnace ("LMF") 100 in accordance with an embodiment of the present invention is shown in FIG. 1. LMF 100 includes, among other items, a ladle 102, a transport mechanism 104 utilized to properly position the ladle, electrodes 106, and an LMF roof 108. As shown in FIG. 1, during the refining process, LMF roof 108 is positioned over ladle 102 and electrodes 106 are lowered through LMF roof 108 and into ladle 102. Any electrodes known in the art for use with LMFs may be utilized in the present invention. Electrodes 102 may vary in quantity, size and material of manufacture based on the specific application of the user. For example and as shown in FIG. 1, LMF 100 may utilize three electrodes when used to refine the molten material. Such electrodes may range from about 14 inches to about 18 inches in diameter, may be of variable lengths and may be manufactured of carbon.

Ladle 102 is typically a refractory lined steel vessel that holds the molten material to be refined during the LMF process. However, in additional embodiments, ladle 102 can be made of any other material known in the art for the constructions of ladles utilized with LMFs. The user's application of ladle 102 may dictate the necessary or preferred construction.

Transport mechanism 104 is utilized to properly place ladle 102 under LMF roof 108 such that refining of the molten material may be accomplished. As shown in FIG. 1, transport mechanism 104 may be in the form of a rail car that is positioned on a track (not shown) for moving ladle 102 into place. LMF 100 of the present invention, however, may utilize other transport mechanisms known in the art for properly positioning a ladle. For example, a turret system may be used that rotates individual ladles into place for refining of the molten material.

LMF roof 108, during the refining process and as shown in FIG. 1, is lowered via a system 110 (e.g., hydraulic or mechanical system) over ladle 102. Support brackets 112 are preferably provided on LMF roof 108 to attach system 110. As indicated above, LMF roof 108 is used to maintain the heat in ladle 102 during the refining process, as well as contain molten material and slag within the ladle 102. Once LMF roof 108 is properly positioned, electrodes 106 are then lowered through LMF roof 108 and into the bath of molten material within ladle 102.

Figure 2:
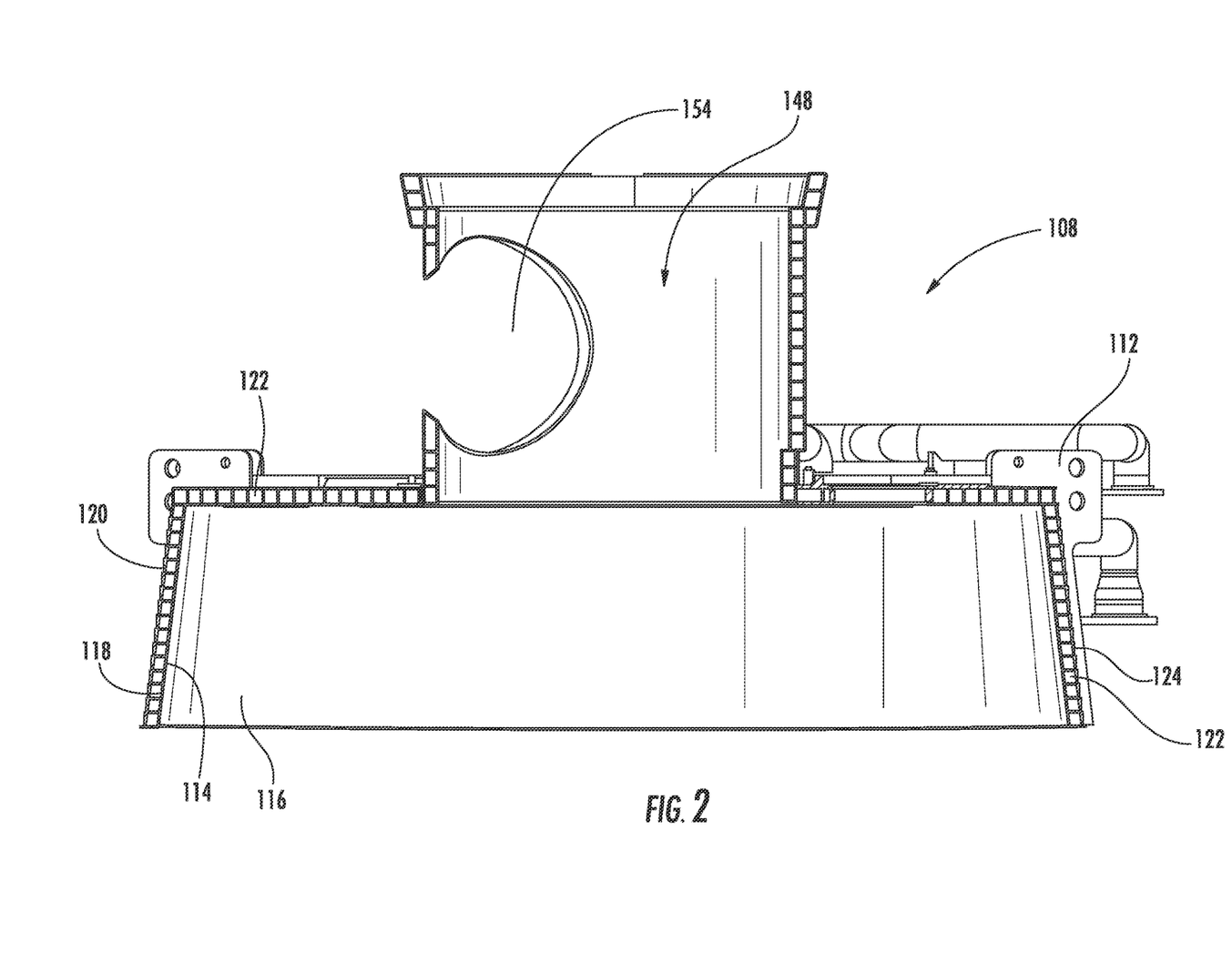
FIG. 2 is a cross-sectional view of a ladle metallurgy furnace roof in accordance with an embodiment of the present invention.
Figure 3:
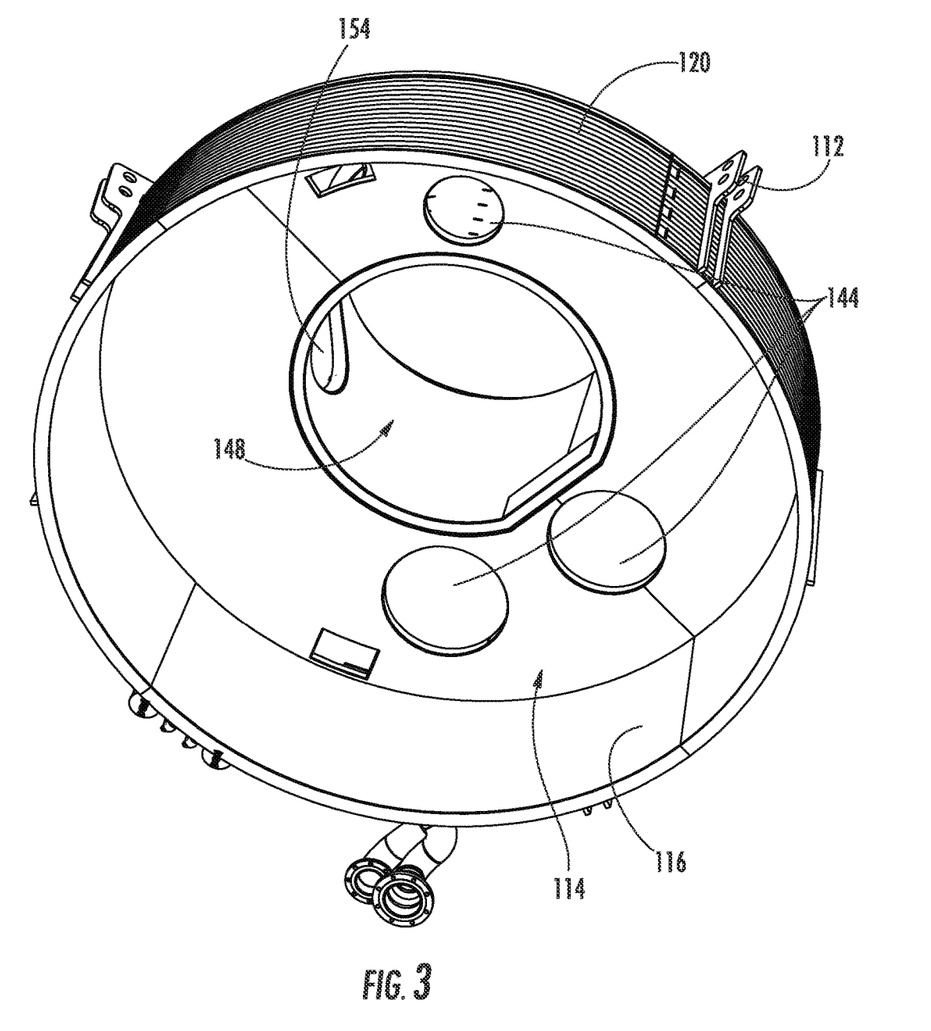
FIG. 3 is an underneath, perspective view of the ladle metallurgy furnace roof of FIG. 2.

As shown in FIG. 2, LMF roof 108 includes an internal surface structure 114 with first and second sides 116, 118. Internal surface structure first side 116 is an exterior surface proximate ladle 102 during the refining process and internal surface structure second side 118 is located opposite internal surface structure first side 116. As can be seen from FIGS. 2 and 3, internal surface structure first side 116 has a substantially smooth surface. In some embodiments, internal surface structure 114 is constructed of either ferrous or non-ferrous plates, for example, steel plates that include a substantially smooth first side. In such embodiments, the steel plates may be A516 Grade 70 or A387 Grade 22. If a multitude of plates are utilized, there are preferably abutted and fixed in place such as by welding in a manner that ensures internal surface structure first side 116 is a substantially smooth surface. For example, the plates may be welded or adjoined together on internal surface structure second side 118. The use of such welding or adjoining techniques may limit the amount of uneven or rough surfaces along internal surface first side 116.

Figure 4:
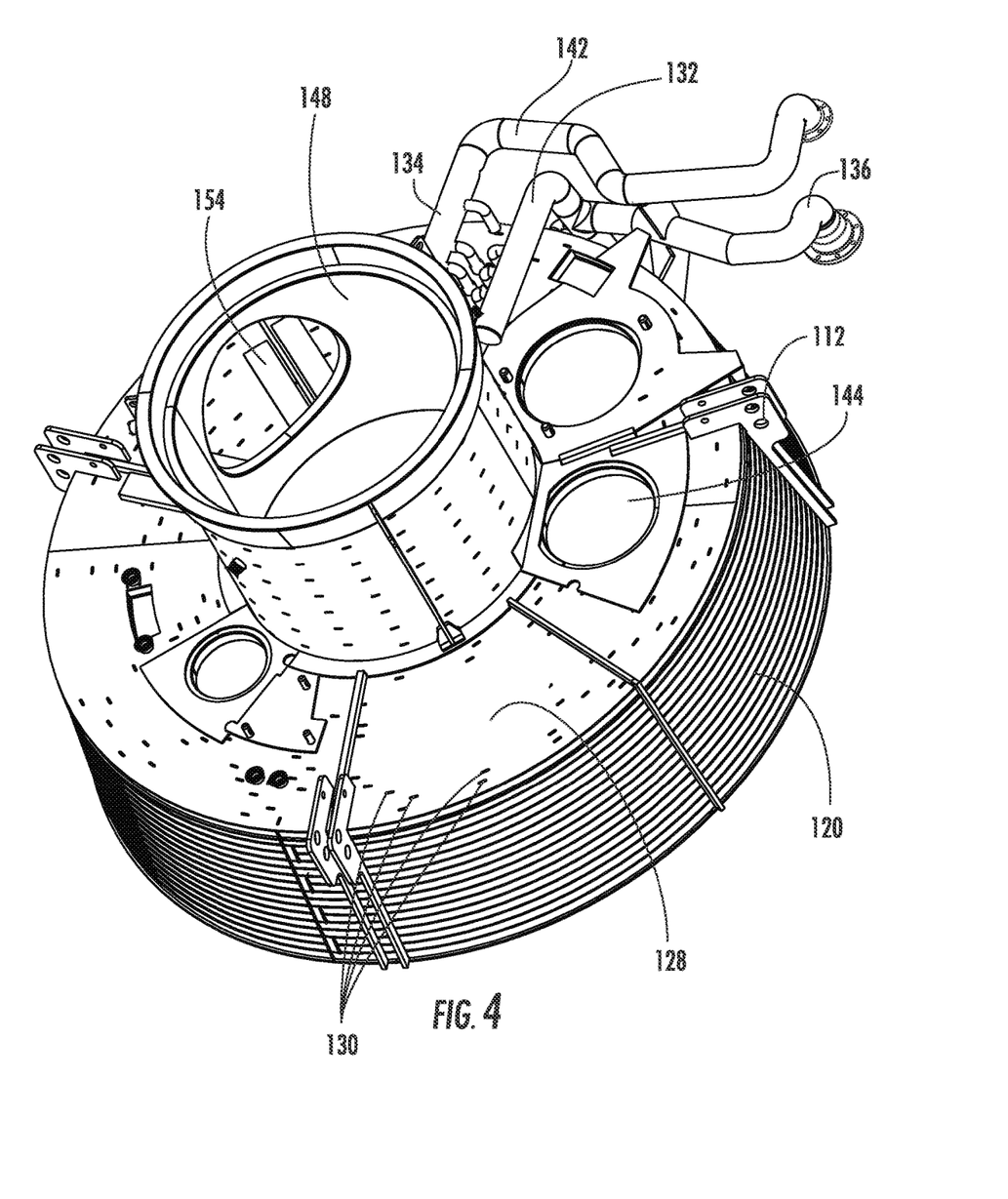
FIG. 4 is a top perspective view of the ladle metallurgy furnace roof of FIG. 2.

As shown in FIG. 4, LMF roof 108 of the present invention further includes an external surface structure 120 spaced apart and outside of internal surface structure 114. (The terms "internal" and "external" as used herein refer to whether the surface structure is oriented toward or away from the ladle interior.)

Figure 5:
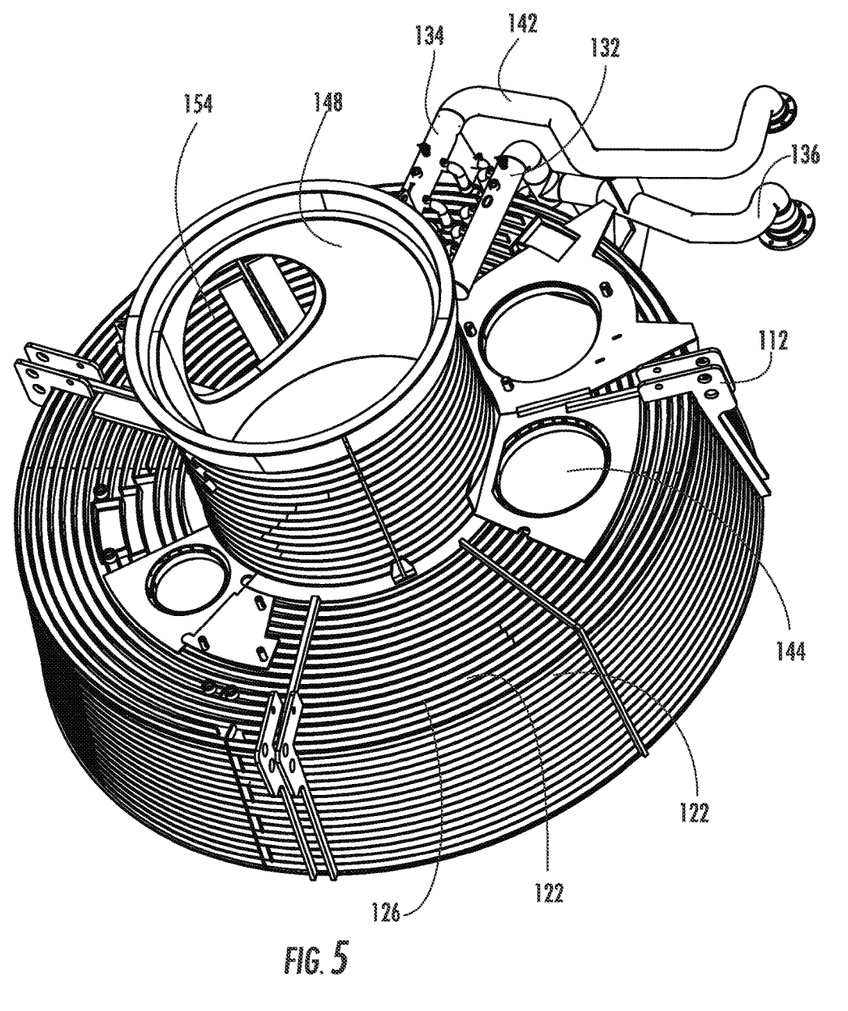
FIG. 5 is a top perspective view of the ladle metallurgy furnace roof of FIG. 2 where the external surface structure is removed to reveal the coolant flow channels therein.
Figure 6A:
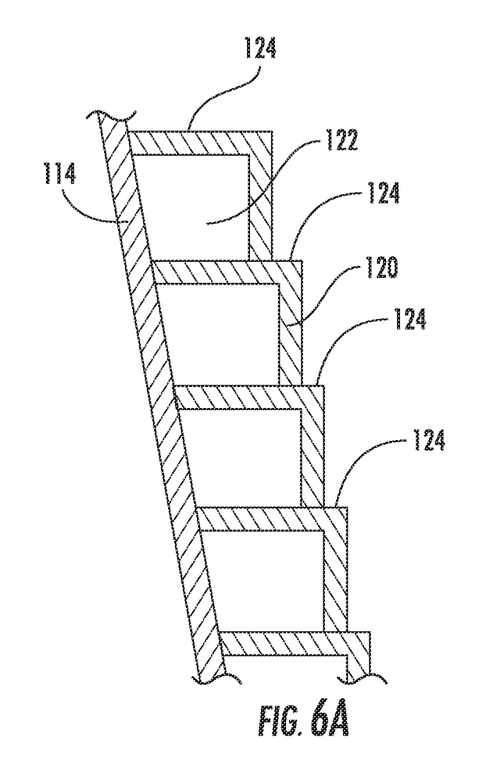
FIG. 6A is an enlarged cross-sectional view showing a manner in which adjacent angle bar has been used to create coolant flow channels in the ladle metallurgy furnace roof of FIG. 2.

Referring now to FIG. 5, LMF roof 108 includes a series of channels 122 between external and internal surface structures 120, 114. Channels 122 are utilized to circulate cooling fluid to protect LMF roof 108 from damage associated with the refining process. In some embodiments and as shown in FIG. 2 and FIG. 6A, individual channels 122 are formed of angle bars 124, either rolled or straight. In such embodiments, rolled angle bar 124 may form external surface structure 120 as well as the internal channel 122.

In this case, individual angle bars may be juxtaposed on internal surface structure 114. The bars are suitably joined by welding to provide internal channels 122. It can be seen that internal surface structure 114 is oriented at a conical angle in the illustrated embodiment. As a result, outer surface structure 120 may have a stair-step configuration on this portion of LMF roof 108.

Figure 6B:
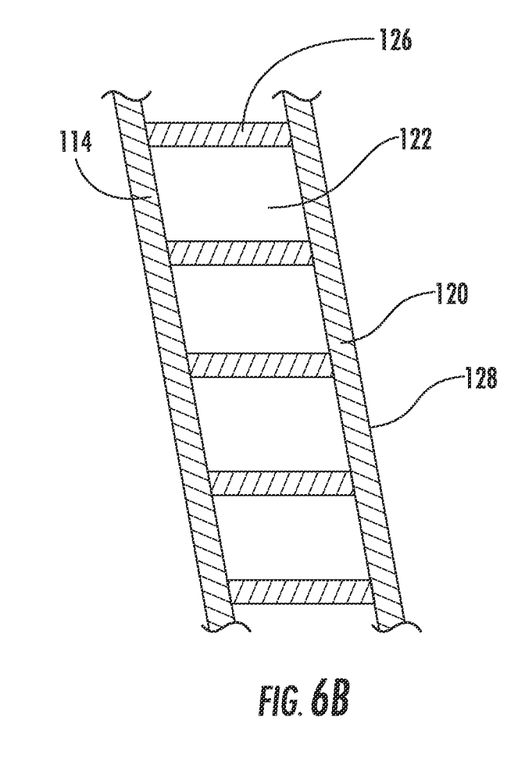
FIG. 6B is a an enlarged cross-sectional view similar to FIG. 6A but showing an embodiment where the channels are formed of flat bar.

Alternatively and as shown in FIG. 6B, channels 122 may be formed of flat bar 126, again, either rolled or straight. In such embodiments, external surface structure 120 may be constructed of metal plates 128 adhered to the bars 126. As shown in FIG. 4, such adhesion may be accomplished with plug welding 130 metal plates 128 to the top of the bars 126. One skilled in the art will appreciate that LMF roof 108 may contain various channels 122 created from both angle bar 124 and flat bar 126 as necessary or desired.

The flow circuits defined by channels 122 may be configured in any manner based on the user's specifications. In this regard, the configuration of channels 122 may be a function of the temperature that LMF roof 108 must obtain or maintain during the refining process. For example, if LMF roof 108 is required to maintain a relatively low temperature in reference to LMF operating procedures, the user may desire to have channels 122 that extend throughout the entire LMF roof 108 (as shown in the Figures) such that cooling fluid can circulate throughout LMF roof 108. In other embodiments, if LMF roof 108 is not required to maintain such a low operating temperature, LMF roof 108 may include only a limited number of channels or a lesser number of discrete flow circuits. Such embodiments may reduce the operating and manufacturing cost of LMF roof 108.

Figure 7:
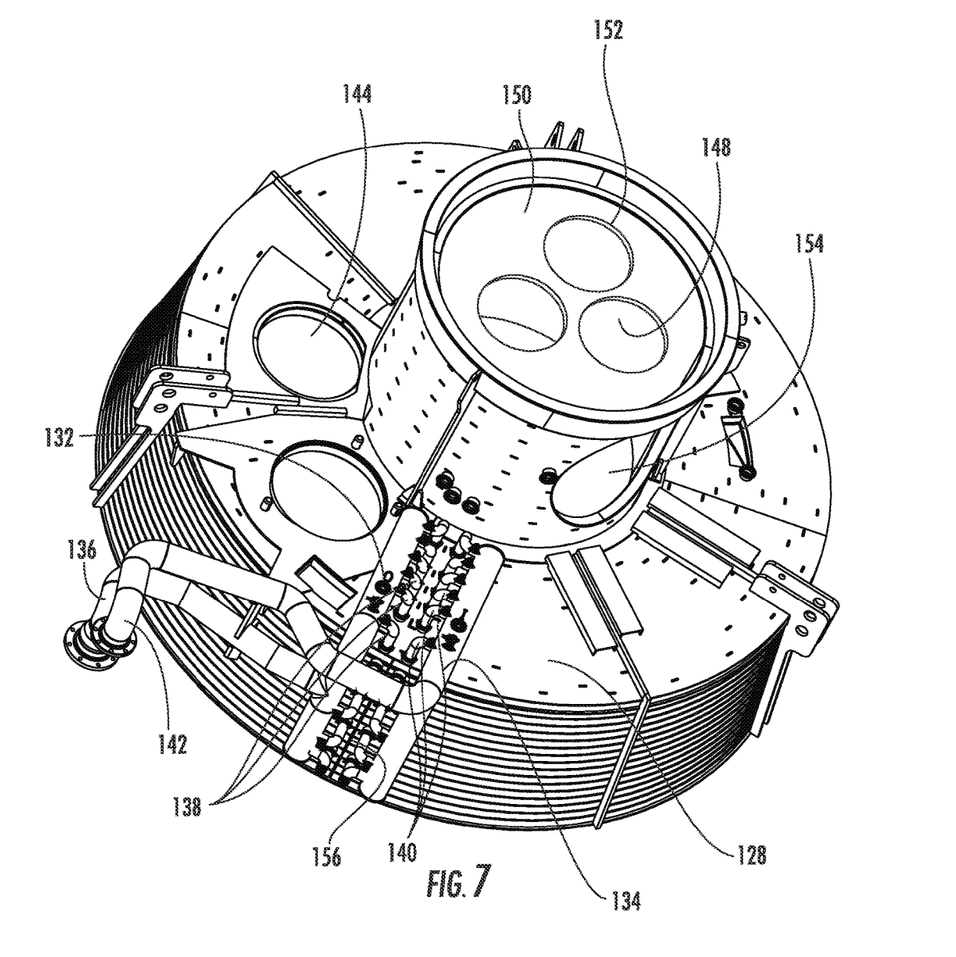
FIG. 7 is a top perspective view of the ladle metallurgy furnace roof of FIG. 2 that more clearly shows the manifold structure and which also includes a delta ring.

As more clearly shown in FIG. 7, LMF roof 108 further includes a supply manifold 132 for delivery of cooling fluid to channels 122 of LMF roof 108 and a return manifold 134 for egress of the cooling fluid after it has circulated through the LMF roof channels 122 and has provided the desired cooling. Supply manifold 132 is in fluid communication with a supply line 136 that provides cooling fluid. A number of supply ports 138 are also in fluid communication with supply manifold 132. Each of supply ports 138 provides fluid communication between supply manifold 132 and at least one channel 122 of LMF roof 108. Similarly, a number of return ports 140 are in fluid communication with return manifold 134. Each of return ports 140 is also in fluid communication with at least one channel 122. Return manifold 134 is in further fluid communication with a return line 142 that carries circulated fluid back to a reservoir or other return location.

Supply and return manifold 132, 134 may be constructed with any number of supply and return ports 138, 140. For example, a respective supply port 138 and return port 140 may be utilized at each channel 122. Such applications may be useful when a high degree of cooling is necessitated. In other embodiments, a smaller number of supply and return ports 138, 140 may be utilized. In such embodiments, cooling fluid may travel around the circumference of LMF roof 108 more than once prior to entering a return port 140.

In order to supply cooling fluid and then return it through the channels to be re-cooled, pressure may be provided at supply line 136 such as by an upstream pump. Alternatively, or in addition, suction may be provided at return line 142. The user's specification will dictate the items necessary or desirable for movement of the cooled fluid. For example, if the user is required to circulate the coolant fluid through LMF roof 108 at a relatively fast rate or for a great distance, pressure and suction may be required. Conversely, if fluid need only travel through a portion of LMF roof 108, LMF may only require either upstream pressure or downstream suction.

LMF roof 108 may further include additive ports 144 as shown in FIG. 7. Additive ports 144 allow the user to add alloys or other additives to the molten liquid during the refining process. Additive ports 144 may be placed at any suitable location of LMF roof 108. Such location of additive ports 144 may be based on the accessibility a user has to a particular area of LMF roof 108 during the refining process.

As shown in FIGS. 2 through 5 and 7, LMF roof 108 includes an electrode port 148. In some embodiments and as shown in the FIG. 7, electrode port 148 preferably includes a delta ring 150 to ensure proper guidance of electrodes 106 through LMF roof 108 and into the molten material in ladle 102. Delta ring 150 may be constructed of refractory to protect it from the heat of electrodes 106. As shown in FIG. 7, this embodiment of delta ring 150 includes three electrode apertures 152 to correspond to the number of electrodes 106 utilized in the LMF process. The number of apertures will thus be dictated by the number of electrodes used in the LMF process.

Delta ring 150 also facilitates directing off-gases that are associated with the procedure out of the system. For example, in FIG. 7, electrode port 148 includes an exhaust recess 154 for connection of an HVAC unit (not shown). During the LMF process, off-gases that enter electrode port 148 can be pulled out through exhaust recess 154 with the use of an HVAC. Without delta ring 150, much of the off-gas volume would rise straight up through electrode port 148. Thus, the illustrated embodiment may aid in reducing the amount of off-gases that escape from LMF roof 108.

Figure 8:
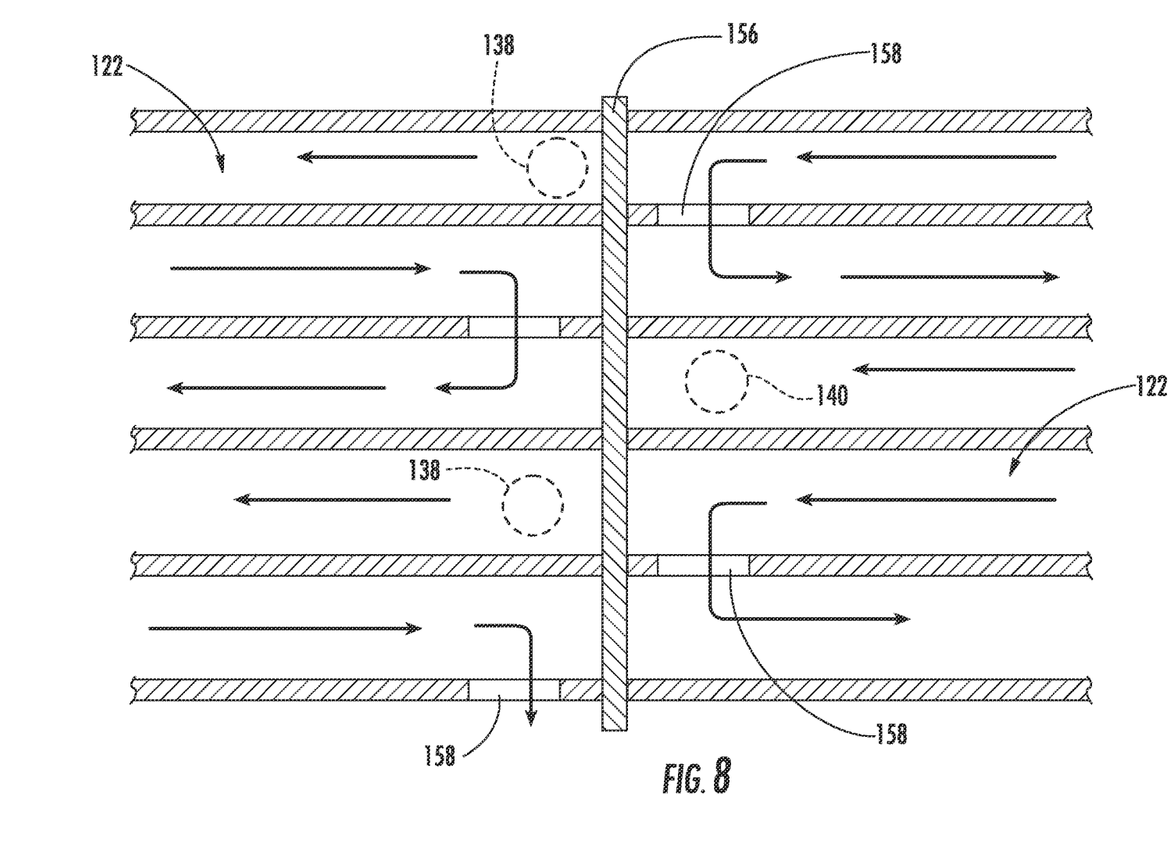
FIG. 8 is an enlarged schematic of the internal channels of a ladle metallurgy furnace roof in accordance with an embodiment of the present invention, which illustrates the travel of cooling fluid in a flow circuit.

Reference is now made to FIGS. 7 and 8 where certain aspects of the operation of LMF roof 108 can be seen. As cooling fluid is provided to supply manifold 132 through the supply line 134, the cooling fluid is then transported to each individual supply port 138 where it then enters channels 122 of LMF roof 108. The cooling fluid is then allowed to travel along the channel 122 until it reaches an associated return port 140. In some instances, the cooling fluid may travel a number of times around the circumference of LMF roof 108. A partition 156 may be used between supply and return ports 138, 136 such that the flow loop will be closed. In addition, as shown in FIG. 8, apertures 158 along channels 122 may allow cooling fluid to move downward to another channel 122 where it counter-flows to reach a return port 140. The configuration of channels 122 along with the position of a return port 140 will dictate the extent of travel for the cooling fluid. For example, longer flow circuits may be formed by having fewer supply and return ports 138, 140 and more apertures 158. Once the cooling fluid has reached a return port 140, it will then be transported from the return port 140 to return manifold 134, and then return line 142.

Any cooling fluid may be utilized in the present invention. In some embodiments, the cooling fluid will be water that is cooled from a refrigeration source prior to entering supply line 136. In other embodiments, the cooling fluid may comprise a water/glycol mixture. Such embodiments may be useful when the cooling fluid is required to have a relatively low temperature. The use of a water/glycol mixture may ensure that the cooling fluid does not freeze, and therefore, does not hinder the performance of the cooling fluid. In such embodiments, a mixture of between about 50% and about 90% water and about 10% and about 50% glycol may be appropriate.

Figure 9:
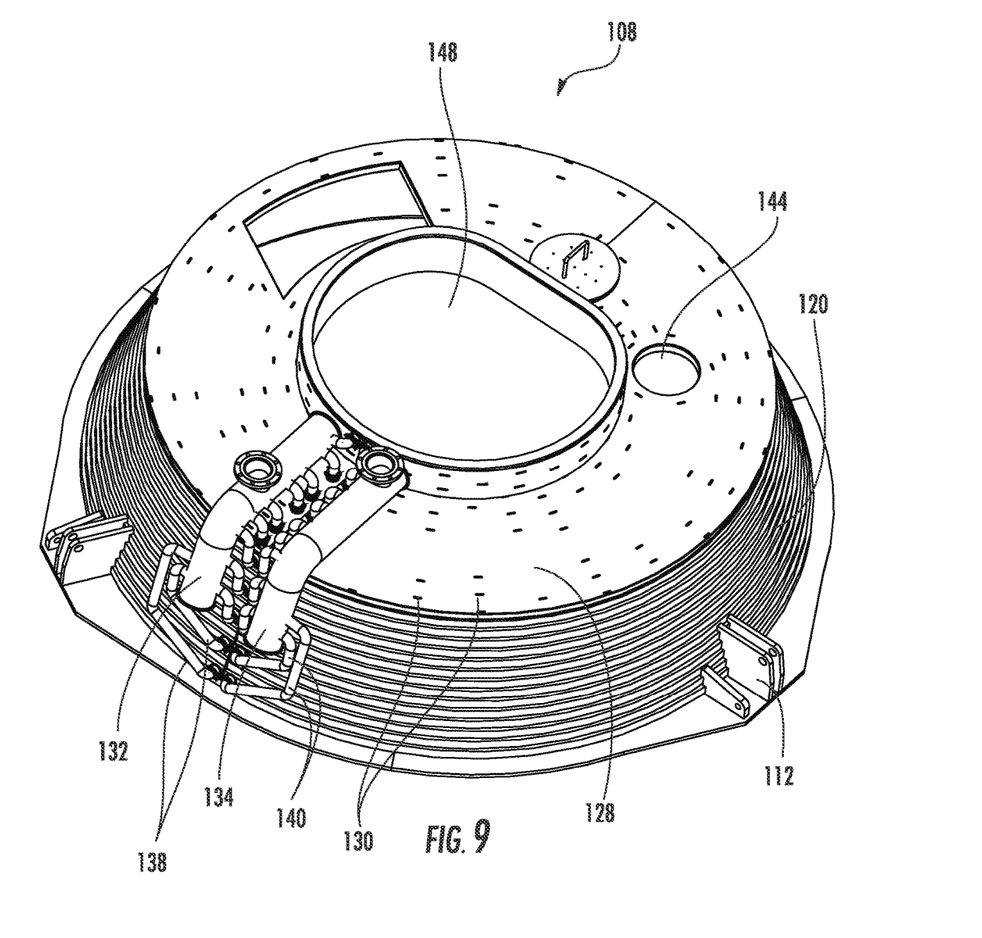
FIG. 9 is a top perspective view of a ladle metallurgy furnace roof in accordance with a second embodiment of the present invention.
Figure 10:
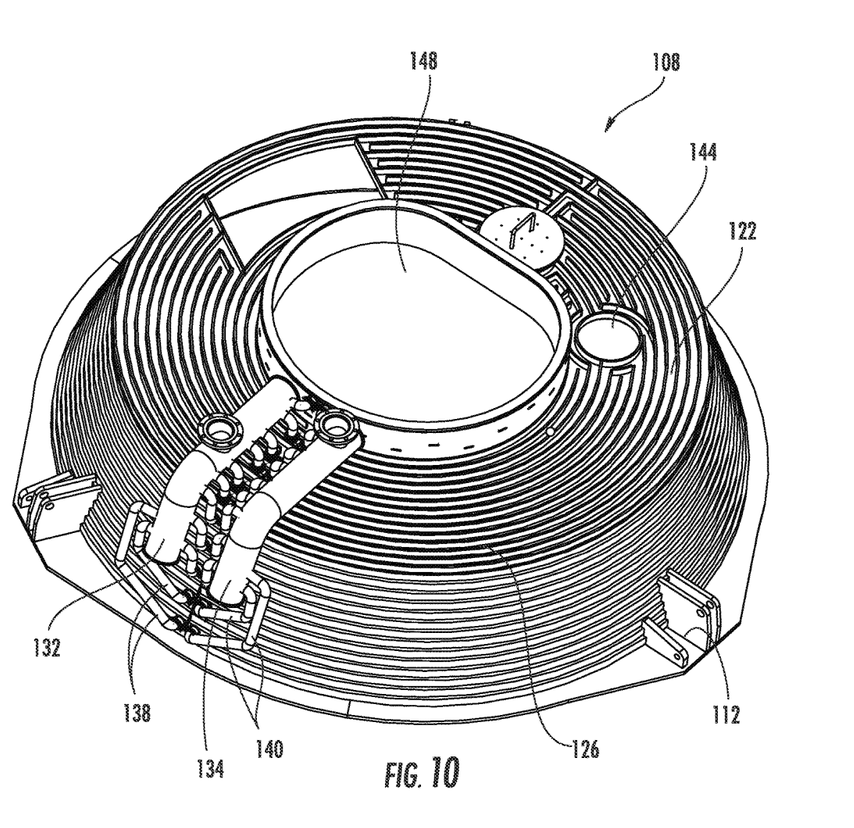
FIG. 10 is a top perspective view of the ladle metallurgy furnace roof of FIG. 9 where the external surface structure is removed to reveal the coolant flow channels therein.

FIGS. 9 and 10 illustrate a second embodiment of LMF roof 108. As illustrated by the Figures, LMF roof 108 of the present invention may vary in its size and shape in order to properly adapt to a particular LMF. As also shown in the Figures, the variations in shape may cause variations in the configurations of channels. However, LMF roof 108 of the present invention may be modified as necessary or desired to ensure the desired cooling. As also shown from the Figures, variations in shape may cause variations in configurations of the channels.

With internal surface first side 116 being a substantially smooth surface, the previous issues of slag adhering to the inside of an LMF roof are reduced. With minimal welding joints, cracks and crevices, the present invention provides limited uneven surfaces to which the slag can adhere. It is believed that such improvements will allow for less maintenance to LMF roofs 108 over time. For example, LMF roofs of the present invention will not be weighed down by excessive slag, thereby avoiding possible problems with the existing systems for lowering and raising the LMF roofs. In addition, LMF roofs of the present invention lessen the requirements for maintenance to remove build up of slag on the inside roof surface. Avoiding such procedures not only avoids the time and costs for removing such excess slag but also avoids the possibilities of causing leaks to existing pipes while removing the slag. Further, the internal smooth surface of LMF roof 108 reduces the occurrences of built-up slag breaking off and falling into the refined material. Slag that falls into the refined material can negatively affect the quality of the material, and may cause additional reworks of the refining process to ensure the quality of the required steel is met.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A ladle metallurgy furnace comprising:
   a. a ladle in the form of a vessel for containing a molten material, said ladle having an open top,
   b. a ladle metallurgy furnace roof positioned over the open top of the ladle; wherein the ladle metallurgy furnace roof includes:
      i. an internal surface structure having a substantially smooth exterior surface;
      ii. an external surface structure spaced apart from said internal surface structure; and
      iii. an electrode opening; and
   c. electrodes extending through the ladle metallurgy furnace roof opening and being received in the ladle,
   wherein the internal surface structure comprises a plurality of metal plates formed of steel, said metal plates adjoined in direct contact at an interior side to form the substantially smooth exterior surface.

2. The ladle metallurgy furnace of claim 1, wherein said exterior surface structure comprises steel plate.

3. The ladle metallurgy furnace of claim 1, wherein a series of coolant channels are formed intermediate the internal surface structure and the external surface structure.

4. The ladle metallurgy furnace of claim 3, wherein at least one channel is in fluid communication with a supply port through the external surface structure and at least one channel is in fluid communication with a return port through the external surface structure.

5. The ladle metallurgy furnace of claim 4, the supply port is in fluid communication with a supply line that provides cooled fluid and wherein the return port is in fluid communication with a return line that returns fluid.

6. The ladle metallurgy furnace of claim 1, wherein the ladle metallurgy furnace roof further comprises additive ports that provide spatial communication between the external surface structure and the internal area of the ladle.

7. The ladle metallurgy furnace of claim 3, wherein at least some of said channels are formed of flat bar interposing and adhered to both of the internal surface structure and the external surface structure.

8. The ladle metallurgy furnace of claim 3, wherein at least some of said channels are formed of L-shaped angle bar attached to the internal surface structure.

9. A ladle metallurgy furnace roof comprising:
   a. an internal surface structure having a substantially smooth exterior surface;
   b. an external surface structure spaced apart from said internal surface structure;
   c. a plurality of channels defined intermediate the first and second surface structures;
   d. a supply port in fluid communication with at least one channel through the second surface structure and in further fluid communication with a supply line;
   e. a return port in fluid communication with at least one channel through the second surface structure and in further fluid communication with a return line,
   wherein the internal surface structure comprises a plurality of metal plates formed of steel, said metal plates adjoined in direct contact at an interior side to form the substantially smooth exterior surface.

10. The ladle metallurgy furnace roof of claim 9, wherein at least some of said channels are formed of flat bar adhered to both the internal surface structure and the external surface structure.

11. The ladle metallurgy furnace roof of claim 10, wherein the external surface structure is adhered to the flat bar by welding.

12. The ladle metallurgy furnace roof of claim 9, wherein at least some of said channels are formed of L-shaped angle bar attached to said internal surface structure.

13. The ladle metallurgy furnace roof of claim 9, wherein external surface structure is formed of steel plate.

14. The ladle metallurgy furnace roof of claim 9, wherein
   a. the supply port is connected to and in fluid communication with a supply manifold that is in fluid communication with the supply line;
   b. the return port is connected to and in fluid communication with a return manifold that is in fluid communication with the return line; and
   c. wherein coolant fluid is circulated through the supply line, supply manifold, supply port, series of channels, return port, return manifold, and return line.

15. The ladle metallurgy furnace roof of claim 9, wherein the ladle metallurgy furnace roof further comprises additive ports.

16. A ladle metallurgy furnace roof comprising:
   a. an internal surface structure having a substantially smooth exterior surface;
   b. an external surface structure spaced apart from said internal surface structure;
   c. a plurality of channels defined intermediate the internal surface structure and the external surface structure;
   d. a supply manifold in fluid communication with a supply line and which further comprises a plurality of supply ports wherein the supply ports are in fluid communication with the supply manifold and are in fluid communication with at least one channel through the external surface structure;
   e. a return manifold in fluid communication with a return line and which further comprises a plurality of return ports wherein the return ports are in fluid communication with the return manifold and are in fluid communication with at least one channel through the external surface structure; and
   f. an electrode opening,
   wherein the internal surface structure comprises a plurality of metal plates formed of steel, said metal plates adjoined in direct contact at an interior side to form the substantially smooth exterior surface.

17. The ladle metallurgy furnace roof of claim 16, wherein coolant fluid is circulated through the supply line, supply manifold, supply port, series of channels, return port, return manifold, and return line.

18. The ladle metallurgy furnace roof of claim 16, wherein at least some of channels are formed of flat bar adhered to both the internal surface structure and the external surface structure.

19. The ladle metallurgy furnace roof of claim 16, wherein at least some of the channels are formed of L-shaped angle bar attached to said internal surface structure.

20. The ladle metallurgy furnace roof of claim 16, wherein the channels define at least one flow circuit between a supply port and a corresponding return port.

21. The ladle metallurgy furnace roof of claim 20, wherein the roof includes multiple flow circuits formed by the channels.

22. The ladle metallurgy furnace roof of claim 16, wherein an aperture is between at least two adjacent channels providing fluid communication between said channels.

23. The ladle metallurgy furnace roof of claim 16, wherein a partition is used within at least one channel to restrict any further flow of coolant fluid.

24. The ladle metallurgy furnace roof of claim 23, wherein an aperture adjacent said partition and between at least two adjacent channels allows flowing coolant fluid in the at least two adjacent channels to flow in opposite directions.

\* \* \* \* \*